United States Patent [19]

Schnitzlein

[11] Patent Number: 5,648,877
[45] Date of Patent: Jul. 15, 1997

[54] OBJECTIVE DIAPHRAGM

[75] Inventor: Markus Schnitzlein, Radolfzell, Germany

[73] Assignee: Computergesellschaft Constance, Constance, Germany

[21] Appl. No.: 161,922

[22] Filed: Dec. 3, 1993

[30] Foreign Application Priority Data

Dec. 3, 1992 [DE] Germany ............... 42 40 734.6

[51] Int. Cl.⁶ .................................................. G02B 26/08
[52] U.S. Cl. .................................................. 359/739
[58] Field of Search ............................. 359/739, 738, 359/740, 196

[56] References Cited

U.S. PATENT DOCUMENTS

| 4,637,718 | 1/1987 | Kirchner et al. | 356/71 |
| 5,221,835 | 6/1993 | Setani | 250/208.1 |
| 5,225,924 | 7/1993 | Ogawa et al. | 359/196 |
| 5,274,480 | 12/1993 | Hirai et al. | 359/51 |

FOREIGN PATENT DOCUMENTS

| 0 411 800 | 2/1991 | European Pat. Off. |
| 4098217 | 3/1992 | Japan. |
| 2 164 470 | 3/1986 | United Kingdom. |

OTHER PUBLICATIONS

"Shaped Aperture for Raster Scanner" by Baran, Xerox Disclosure Journal, vol. 8, No. 2, Mar./Apr. 1983, p. 159.

*Primary Examiner*—Scott J. Sugarman
*Attorney, Agent, or Firm*—Hill, Steadman & Simpson

[57] ABSTRACT

A diaphragm for an objective for imaging an image original to be scanned line-by-line onto an optical CCD sensor is provided in the optical part of a scanner device for automatic optical character recognition. The diaphragm has a diaphragm aperture expanded in a direction proceeding orthogonally relative to the CCD sensor. The shape of the diaphragm aperture deviates from a circular diaphragm aperture shape.

8 Claims, 1 Drawing Sheet

OBJECTIVE DIAPHRAGM

BACKGROUND OF THE INVENTION

1. Field of the Invention

The invention is directed to an objective diaphragm for imaging an image original to be scanned line-by-line onto an optical CCD sensor.

2. Description of the Prior Art

Automatic optical character recognition systems for reading image originals (i.e., documents, forms and the like) can be fundamentally divided into two subsystems. The first subsystem is the acquiring and processing of the image original mensurationally, whereas the second subsystem is the actual image recognition. The acquisition system usually has an optoelectric scanner device (scanner) that can be divided into an optical part and a processing part.

The optical part has optical imaging components with which the image original to be scanned is imaged onto a line or surface sensor for image acquisition. For example, known line sensors include CCD sensors (Charge Coupled Devices) that can be used in various lengths and pixel sizes.

A quantity of light generated by an illumination system is supplied to the sensor via an objective in the imaging optics. This quantity of light, among other things, is determined by the aperture relationship of the objective that is defined by the aperture diameter and focal length thereof. To limit image errors in the optical imaging and to avoid stray light within the scanner device, the objective has a diaphragm. However, the diaphragm thus also limits the amount of light incident on the sensor.

Many conflicting demands are made of the imaging optics that cannot be simultaneously fulfilled. One example is the desire for an optimally large diaphragm aperture to achieve a high light intensity on the sensor and, thus, a high scanning speed. This goal is opposed by the requirement of having a small diaphragm aperture for achieving a high depth of field and thus, good scan quality.

SUMMARY OF THE INVENTION

It is an object of the present invention to provide a diaphragm of the type initially cited to optimize the optical imaging properties in view of the competing goals of increased scanning speeds and scan quality.

In comparison to known diaphragms, the diaphragm of the present invention has an enlarged diaphragm aperture that can be maintained in view of the optical quality requirements only in a certain direction defined by the arrangement of the CCD sensor, whereas it exhibits a degree of freedom with respect to the optical quality requirements in the direction perpendicular to the CCD sensor. While maintaining the optical quality demands, a higher scan rate in the line-by-line scanning can be simultaneously achieved with the expanded diaphragm aperture.

It is another object of the present invention to provide a diaphragm aperture that is symmetrically expanded. This has the advantage of uniformly illuminating the measuring plane.

It is a further object of the invention to provide a diaphragm aperture that preferably has a biconvex shape, so that an eye-shaped diaphragm aperture results. The biconvex-shaped diaphragm is expanded in comparison to a known pupil-like diaphragm aperture shape. Gains in the light intensity in the measuring plane can be achieved by this embodiment. Another preferred diaphragm aperture shape is rectangular.

These objects are inventively achieved by an objective diaphragm for imaging an image original to be scanned line-by-line onto an optical CCD sensor line, having a diaphragm aperture with a greater expanse orthogonally relative to the CCD sensor line than parallel to the CCD sensor line.

BRIEF DESCRIPTION OF THE DRAWINGS

The invention shall be set forth in greater detail with reference to an exemplary embodiment shown in a drawing.

DESCRIPTION OF THE PREFERRED EMBODIMENT

Figure 1:
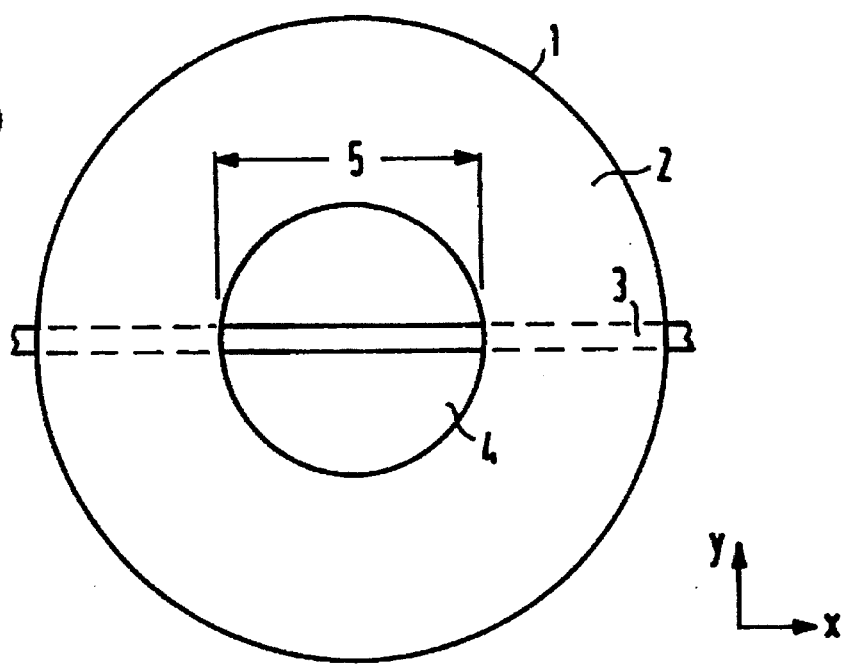
FIG. 1 shows a known type of objective diaphragm.

FIG. 1 shows an objective 1 having an accompanying diaphragm 2 that form the imaging optics in the optical part of a scanner device. Using these optics, an image original (i.e., a document, form or the like) is imaged onto an optical CCD sensor 3. The light quantity generated by an illumination system provided in the scanner device and incident onto the sensor plane represents a measure of the scan quality and the scanning speed.

The diaphragm 2 is used in the objective 1 for improving the scan quality. As a consequence, however, the light intensity incident onto the CCD sensor 3 is limited. A line-by-line scanning of the image original occurs with the assistance of the CCD sensor 3. This image original is conveyed under the optics in a scan direction coinciding, for example, with the y-direction of an x, y-coordinate system. Given a quality standard with respect to the optical properties at the location of the CCD sensor 3, the known objective diaphragm of FIG. 1 has, for example, a circular diaphragm aperture 4. An aperture ratio can be derived from the aperture diameter 5. The effective focal length of the objective 1 can be determined.

Figure 2:
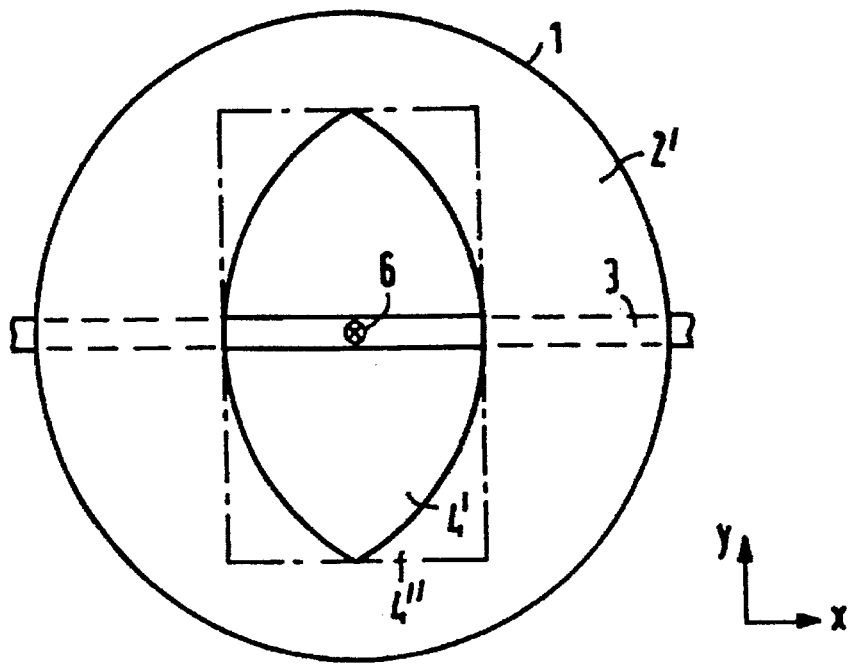
FIG. 2 shows an objective diaphragm of the present invention.

An optimization of the competing requirements of having a large diaphragm aperture and a great depth of field on the imaging optics in line-by-line scanning results in an objective diaphragm 2' according to FIG. 2. This diaphragm 2' has a diaphragm aperture 4' that, in comparison to the known diaphragm aperture of FIG. 1, satisfies the imaging-optical quality rules for the scanning in x-direction and that, by being expanded in the scan direction y proceeding orthogonally relative to the CCD sensor 3, improves the imaging-optical properties of the objective diaphragm in view of the total quantity of light incident onto the measuring plane.

Depending on the desired quality or quantity rules, the diaphragm aperture 4' can also be varied in the privileged direction x defined by the CCD sensor used in the line-by-line scanning. The two dimensions of the diaphragm aperture 4' are to be modified, but not completely independently of one another. Their dependency decreases with increasing distance from an optical axis 6 proceeding through the objective 1. The diaphragm aperture 4' of the present invention is preferably symmetrically expanded at both sides of the optical axis 6 along the direction proceeding perpendicularly to the CCD sensor 3. This embodiment achieves a uniform illumination of the measuring plane. A diaphragm aperture 4' symmetrically expanded when compared to a known circular diaphragm aperture shown in FIG. 1 has a biconvex aperture shape similar to an eye. Gains in light intensity can be achieved with this embodiment of the invention when compared to the known, pupil-like shape of a diaphragm aperture. Another embodiment of a diaphragm aperture 4" comprises a rectangular shape that, for example, can be varied down to a slit diaphragm.

The diaphragm aperture of FIG. 1 has an aperture ratio of, for example, 1/5.6, whereas the diaphragm aperture 4' of the invention shown in FIG. 2 has a value of 1/6.0 in, for example, the x-direction and has a value of 1/2.8 in the orthogonal direction, y.

Although other modifications and changes may be suggested by those skilled in the art, it is the intention of the inventor to embody within the patent warranted hereon all changes and modifications as reasonably and properly come within the scope of his contribution to the art.

I claim:

1. An objective diaphragm for imaging an image original to be scanned line-by-line onto an optical CCD sensor line, comprising a diaphragm aperture having a greater expanse orthogonally relative to said CCD sensor line than parallel to said CCD sensor line.

2. Diaphragm according to claim 1, wherein said diaphragm aperture is symmetrically expanded.

3. Diaphragm according to claim 1, wherein said diaphragm aperture is biconvexly shaped.

4. Diaphragm according to claim 1, wherein said diaphragm aperture is rectangularly shaped.

5. An objective diaphragm, which coacts with an objective to form imaging optics to project an image of an original line-by-line onto an optical CCD sensor line, said diaphragm comprising means for increasing both a scanning rate and scanning quality, said means being a diaphragm aperture having a greater expanse orthogonally relative to said CCD sensor line than parallel to said CCD sensor line.

6. An objective diaphragm according to claim 5, wherein said diaphragm aperture is symmetrically expanded.

7. An objective diaphragm according to claim 5, wherein said diaphragm aperture is biconvexly shaped.

8. An objective diaphragm according to claim 5, wherein said diaphragm aperture is rectangularly shaped.

* * * * *